US007559333B2

(12) United States Patent
Belanger

(10) Patent No.: US 7,559,333 B2
(45) Date of Patent: Jul. 14, 2009

(54) VEHICLE WASH APPARATUS

(76) Inventor: Michael Belanger, 21300 Chase Dr., Novi, MI (US) 48375

( * ) Notice: Subject to any disclaimer, the term of this patent is extended or adjusted under 35 U.S.C. 154(b) by 520 days.

(21) Appl. No.: 11/036,549

(22) Filed: Jan. 14, 2005

(65) Prior Publication Data
US 2006/0157093 A1    Jul. 20, 2006

(51) Int. Cl.
*B08B 3/00* (2006.01)
(52) U.S. Cl. ........................ 134/180; 134/123
(58) Field of Classification Search .................. 134/84, 134/94.1, 123, 172, 177, 180, 198
See application file for complete search history.

(56) References Cited

U.S. PATENT DOCUMENTS

| 5,033,490 | A  | * | 7/1991 | Wade et al. ............... 134/123 |
| 6,264,754 | B1 | * | 7/2001 | Bowman ....................... 134/6 |
| 6,372,053 | B1 |   | 4/2002 | Belanger et al. ............... 134/34 |
| 6,595,221 | B2 | * | 7/2003 | Jones et al. ................ 134/57 R |
| 6,666,391 | B2 | * | 12/2003 | Lai ............................ 239/752 |
| 6,857,438 | B2 | * | 2/2005 | Anderson .................. 134/58 R |
| 7,100,621 | B2 | * | 9/2006 | Johnson ....................... 134/123 |
| 2002/0162581 | A1 | * | 11/2002 | Heinze et al. ............. 134/56 R |

* cited by examiner

*Primary Examiner*—Michael Barr
*Assistant Examiner*—Jason Heckert
(74) *Attorney, Agent, or Firm*—Warn Partners, P.C.

(57) ABSTRACT

A vehicle wash apparatus including a carriage assembly is supported above a vehicle. A pair of opposed shuttle assemblies are operatively supported by the carriage assembly and moveable generally transverse to the carriage assembly. A pair of spray manifold assemblies are operatively supported by one of the opposed shuttle assemblies, and each of the spray manifold assemblies includes a vertical manifold. Each of the pair of spray manifold assemblies are moveable rectilinearly with the carriage assembly, transversely with the shuttle assemblies, and pivotally about the vertical manifold to allow the pair of spray manifold assemblies to move toward and away from one another and to circumscribe the vehicle.

22 Claims, 9 Drawing Sheets

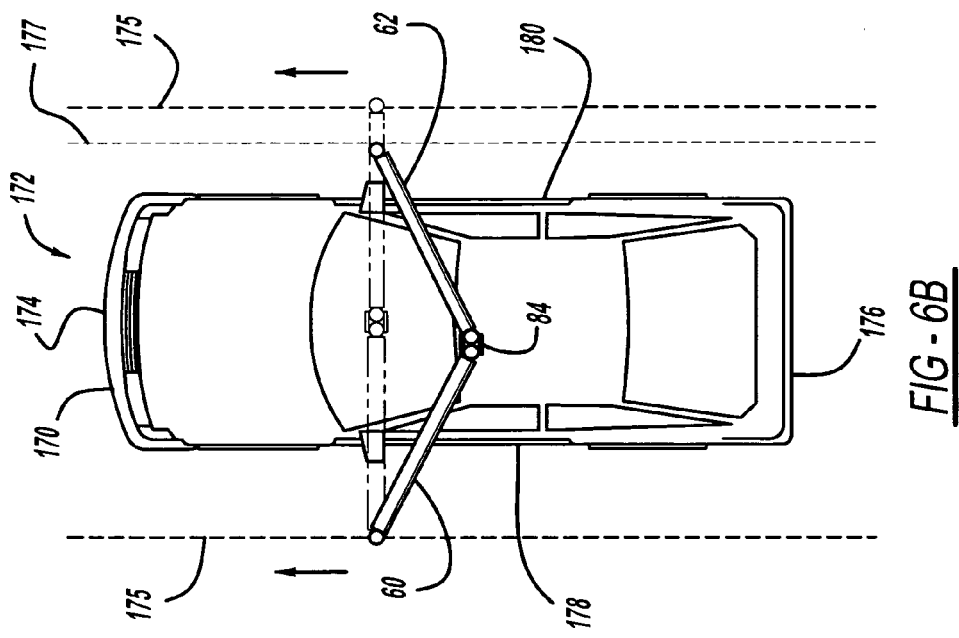
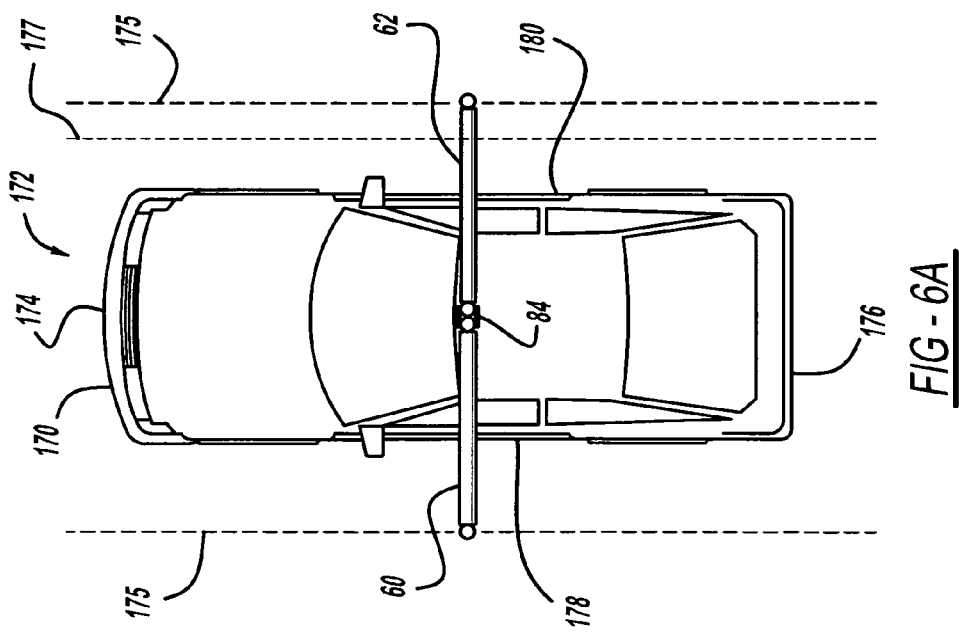

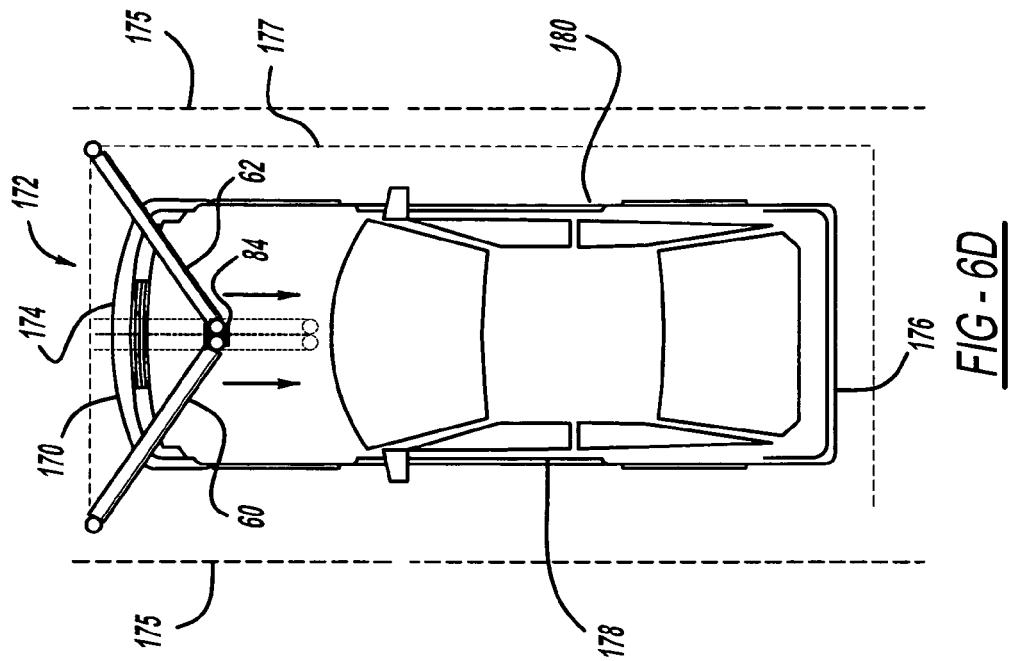
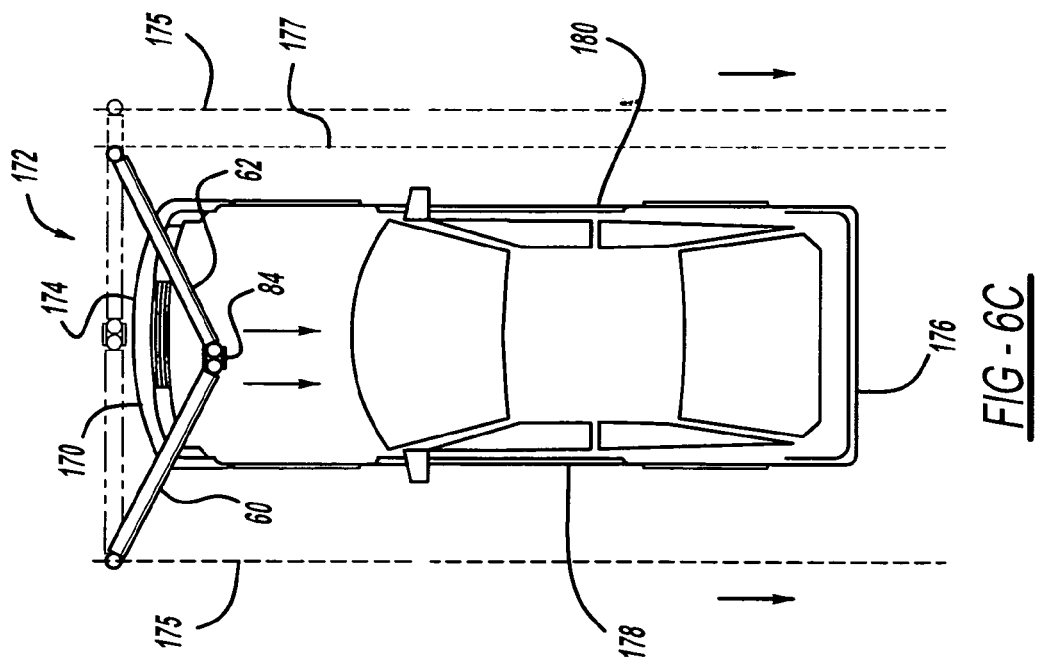

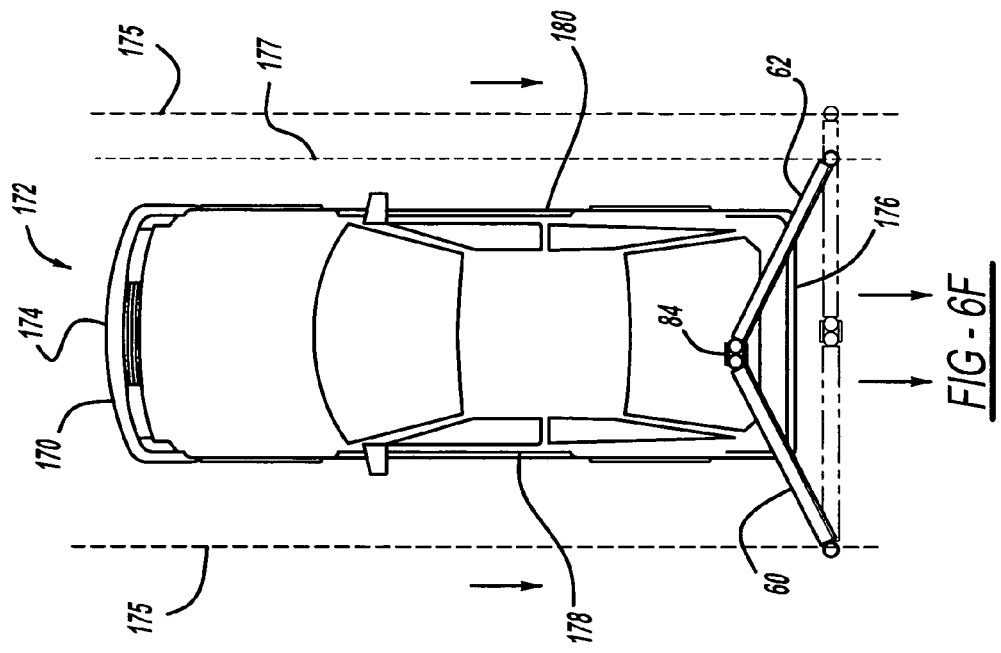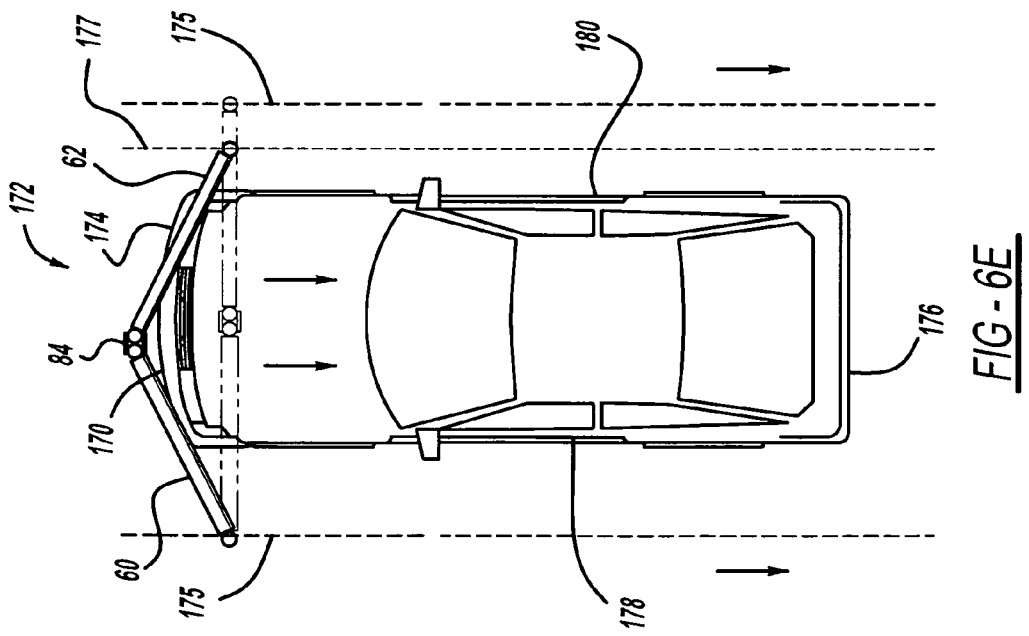

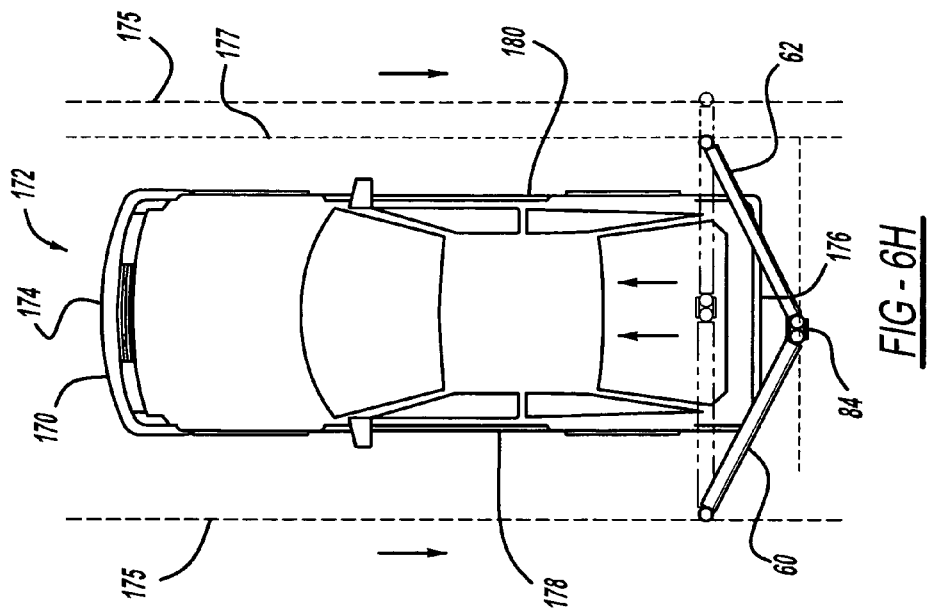
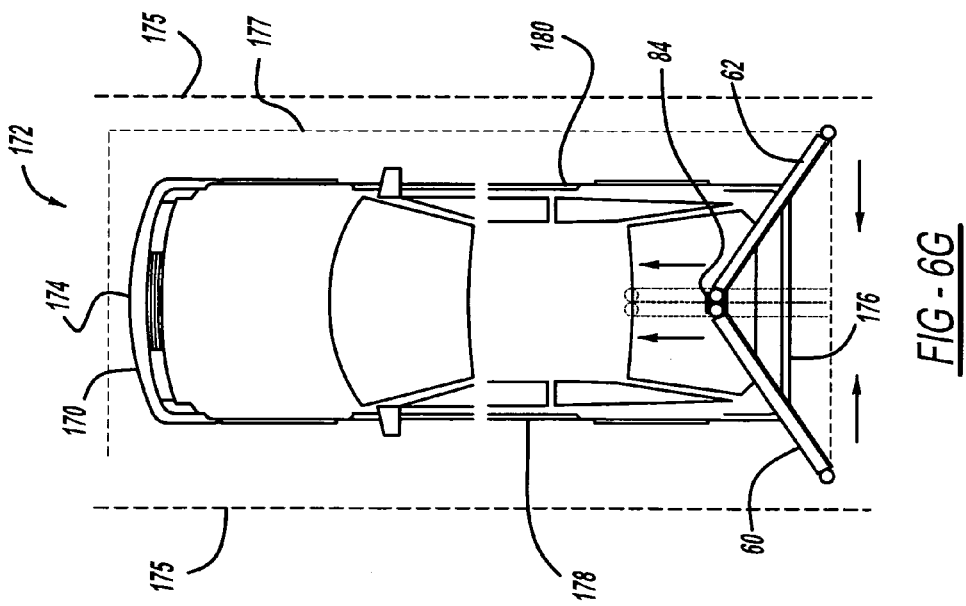

VEHICLE WASH APPARATUS

BACKGROUND OF THE INVENTION

1. Field of the Invention

The present invention relates, generally, to a vehicle wash apparatus and, more specifically, to a vehicle wash apparatus having a pair of spray arms adapted to move about the surface of the vehicle at an optimum cleaning distance.

2. Description of the Related Art

Motor vehicles are washed and cleaned in order to preserve and extend the life of the vehicle finish and maintain its appearance. Automatic drive-through wash facilities that provide this service are well known. For example, traditional tunnel, conveyor-type wash facilities are common in this industry and typically employ an array of equipment that sequentially treats the vehicle as it passes through the facility. While these systems have generally worked for their intended purpose, the traditional tunnel systems occupy a considerable amount of space and often require a considerable amount of maintenance to keep the associated series of wash mechanisms operational. Further, the traditional tunnel systems generally consume sizable amounts of water and wash chemicals.

In addition to the tunnel systems, small bay wash systems are also employed in the related art. These systems provide space-savings over the tunnel conveyor systems. Accordingly, they may be employed in a variety of locations where space is at a premium, such as a single garage size bay in a gas station or at a convenience store. Additionally, the small bay wash systems generally provide directed nozzles or movable spray arms with jets to deliver pressurized water and chemicals to the surface of the vehicle. In this way, the small bay wash systems generally consume far less water and chemicals as compared with tunnel systems. Given these advantages, small bay wash systems have proliferated. Of these, the majority are rollover type vehicle wash systems. Rollover wash systems are so named because they move a wash mechanism back and forth about (i.e. roll over) a stationary vehicle. Rollover wash systems confine the wash event to one relatively small area, which allows the water and chemicals to be applied more effectively and efficiently.

A gantry-type system is one example of a rollover vehicle wash system of the kind generally known in the art. The gantry style rollover wash system includes a movable system in which the wash mechanisms are contained within a large rigid inverted "U"-shaped housing that surrounds the vehicle and rides back and forth in floor-mounted tracks. However, the width of the gantry system is not adjustable and therefore limits the size of the vehicle that can be effectively washed and puts wider vehicles at risk for damage. Further, the floor tracks can easily be fouled by debris causing the gantry to stall along its travel. To counter these problems, some gantry style systems are constructed having a wider wash envelope that is designed to span wider vehicles. Gantry style systems of this type typically move the track farther outboard of the vehicle. However, with this wider structure, smaller vehicles are not as effectively cleaned without the addition of costly, complex spray arms that are controlled to extend inwardly from the gantry toward the vehicle. Additionally, properly cleaning the front and rear ends of the vehicle can be problematic for gantry style wash systems unless further extendable spray arms that can reach these areas are added. Ultimately, widening the gantry so that a greater variety of vehicles can be effectively washed and so that the tracks are less prone to fouling causes the gantry to be much less efficient. Moreover, compensating for the loss of efficiency by adding additional extending spray arms increases the cost and complexity of the gantry style systems.

In addition to the moveable gentry style devices, it is also known to provide wash systems that employ a fixed or rigid frame. A rigid frame wash system has a wide stationary frame that spans the wash area and provides an overhead carriage assembly that moves along the frame over the vehicle. This avoids the vehicle width and floor track issues, but causes other limitations and drawbacks to arise. For example, one conventional rigid frame wash system includes an overhead support for a single inverted L-shaped spray arm that extends from a centrally located shuttle. The L-shaped spray arm has both vertically and horizontally-aimed spray nozzles and moves longitudinally, laterally, and pivotally to circumscribe a parked vehicle. The controlled movement of the spray arm requires a complex and expensive mechanical system. Specifically, there are many moving parts that are required to the constantly adjust the single spray arm as it moves around the vehicle to keep the spray arm at an efficient washing distance from the vehicle without striking it. Thus, there remains a need in the art for an improved vehicle wash system employed with a rigid frame that has a mechanically simplified structure to efficiently move spray arms about the vehicle.

Further, the location of the pivot point of the single spray arm causes washing inefficiencies. For example, when the spray arm reaches the ends of the vehicle, the arm must go beyond the end, stop and then pivot 90 degrees to begin a sweep of the end surface. In so doing, the downwardly-directed nozzles cover a sector-shaped area of the hood and trunk lid a number of times and the horizontally-directed nozzles spray into empty space for a significant period. This is time-consuming, inefficient, can result in wasted water and chemicals, and can increase the associated sewage costs for waste water. Other conventional rigid frame type wash systems have employed two arms from a central shuttle that are somewhat faster, but still wasteful of water and chemicals. Thus, there remains a need for an improved vehicle wash system employed with a rigid frame that has two spray arms that circumscribe the vehicle quickly and efficiently with an effective but minimal use of water and chemicals.

In addition to these shortcomings, conventional wash systems are easily damaged if their moving spray arms come in contact with the vehicle. This may happen during the course of the wash event where a malfunction of the control of the wash can cause the spray arms to strike the vehicle, or during the movement of the vehicle in and out of the wash area if an errant driver strikes a spray arm with the vehicle. Regardless, the spray arms of a typical wash apparatus are not designed to withstand an impact of this kind. Similarly, the spray arms can cause reciprocal damage to the vehicle in these circumstances. The resulting damage to the wash system and to the vehicle is due to the rigid nature of the spray arm assemblies of the conventional systems. Thus, there remains a need in the art for a rigid frame overhead wash systems that is configured to avoid damage to either the system or the vehicle.

In attempting to reduce any damage due to collision between the vehicle and the wash system, some rigid frame wash systems have employed inverted L-shaped spray arms that include breakaway joints. However, these wash systems place the breakaway joint at the upper, overhead pivot points so that the L-shaped spray arms remain substantially nonflexible. This offers some protection for the spray arm but does not prevent damage to the vehicle. Furthermore, the typical breakaway joint requires a maintenance technician to manually reset the spray arm in the event the arm becomes deflected and often requires the replacement of parts of the joint Therefore, in conventional wash systems, an inadvertent contact with a vehicle not only causes damage to the vehicle, but also forces the wash system to be shut down until the arm is manually reset or repaired and the system restarted. Thus, there remains a need in the art for an improved vehicle wash system having spray arms with a breakaway feature that minimizes any damage to a vehicle and that can quickly reset without requiring any replacement of parts or other maintenance assistance.

Furthermore, the optimum vehicle wash is one in which the spray arms are placed at a predetermined optimal distance from the vehicle, but not so close as to strike it while circumscribing the surface. However, the conventional wash systems do not generally employ sensor systems to determine the actual placement or the relative dimensions of the vehicle as it sits in the wash area then use this information to control the spray arms. Those that do employ rudimentary sensing devices merely do so to identify that the vehicle is located within certain boundaries of the wash area so that the spray arms will not likely strike the vehicle, but do not provide this information to the electronic control unit (ECU) to control the placement and movement of the spray arms during the wash event. However, these systems generally do not move the spray arms into close predetermined proximity with the sides of the vehicle in ensure an efficient and high quality wash event each and every time. Thus, there remains a need in the art for an improved vehicle wash system that employs a sensor system to provide specific information to a higher-level control device regarding the distance between the spray arms and the vehicle so that the movement of the spray arms may be optimally controlled.

Accordingly, there remains a need in the related art for an improved vehicle wash system employed with a rigid frame that has a mechanically simplified structure to efficiently move spray arms about the vehicle, utilizes two spray arms to circumscribe the vehicle quickly and efficiently with an effective but minimal use of water and chemicals, that minimizes or prevents damage to a vehicle and that quickly resets itself in the event of a collision without requiring any replacement of parts or other maintenance assistance, and utilizes a sensor system to operatively control the movement of the spray arms.

SUMMARY OF THE INVENTION

The disadvantages of the related art are overcome by the vehicle wash apparatus of the present invention that includes a carriage assembly adapted to be supported above a vehicle and moveable rectilinearly along the length thereof. This wash apparatus further includes a pair of opposed shuttle assemblies operatively supported by the carriage assembly and moveable toward and away from one another in a direction generally transverse to the rectilinear movement of the carriage assembly. A pair of spray manifold assemblies are provided for delivering fluid to the vehicle with each manifold assembly operatively supported by a corresponding one of the opposed shuttle assemblies. Each spray manifold assembly includes a vertical manifold portion operatively supported for rotational movement by a corresponding one of the pair of shuttle assemblies about an axis defined by the vertical manifold portion. Each of the pair of spray manifold assemblies are moveable rectilinearly with the carriage assembly along the length of the vehicle, transversely with the respective one of the pair of shuttle assemblies to adjust the location of the vertical manifold portion relative to the vehicle, and pivotally about the axis defined by the vertical manifold portion to allow the pair of spray manifold assemblies to move toward and away from one another and to circumscribe the vehicle.

In another embodiment of the vehicle wash apparatus of the present invention, the carriage assembly includes a pair of shuttle rails extending generally transverse to the direction of rectilinear movement of the carriage assembly. A pair of opposed shuttle assemblies are operatively mounted to the pair of shuttle rails and are independently moveable toward and away from one another in a direction generally transverse to the rectilinear movement of the carriage assembly. A pair of spray manifold assemblies are provided for delivering fluid to the vehicle with each manifold assembly having a vertical manifold portion operatively supported for rotational movement about an axis defined by the vertical manifold portion. Each of the pair of spray manifold assemblies are also rectilinearly moveable with the carriage assembly along the length of the vehicle, transversely and independently movable with the respective one of the pair of shuttle assemblies toward and away from one another to adjust the location of the vertical manifold portions relative to the vehicle, and pivotally movable about the axis defined by the vertical manifold portion to circumscribe the vehicle.

In another embodiment of the vehicle wash apparatus of the present invention, the pair of spray manifold assemblies includes a horizontal manifold portion, a vertical manifold portion operatively supported for rotational movement by the carriage assembly about an axis defined by the vertical manifold portion, and an intermediate spray manifold portion disposed at a predetermined angle relative to and extending between the horizontal and vertical manifold portions. Each of the pair of spray manifold assemblies are rectilinearly moveable with the carriage assembly along the length of the vehicle, transversely moveable to adjust the location of the pair of spray manifold assemblies relative to the vehicle, and pivotally movable about the axis defined by the vertical manifold portion to circumscribe the vehicle.

In another embodiment of the vehicle wash apparatus of the present invention, the vertical manifold portions include a breakaway safety joint having a flexible coupling portion defined between a pair of rigid vertical portions and a return biasing member. The breakaway safety joint acts to allow the vertical manifold portion to flex about the flexible coupling portion in response to contact with an obstruction and the return biasing member acting to bias the flexible coupling portion back into vertical alignment when the obstruction is removed.

Still another embodiment of the vehicle wash apparatus of the present invention includes a pair of sensor assemblies that are each disposed upon one of the respective shuttle assemblies and oriented to determine the transverse position of the respective spray manifold assemblies within the carriage assembly with respect to the sides of the vehicle such that the sensor assemblies sense the distance of the spray manifold assemblies from the sides of the vehicle and provide the information to a higher level control.

Thus, the embodiments of the present invention overcome the limitations of the conventional vehicle wash systems by providing a vehicle wash system including a rigid frame that has the advantage of a mechanically simplified structure. The simplified structure utilizes two independently movable spray manifold assemblies to circumscribe the vehicle quickly and efficiently with an effective but minimal use of water and chemicals. Another advantage of the present invention is that the spray manifold assemblies employ vertical, horizontal, and intermediate manifold portions to efficiently apply the wash chemicals. Another advantage of the present invention is that damage to the vehicle and to the wash system is greatly reduced by breakaway safety joints in each spray manifold assembly. Still another advantage is that the breakaway safety joints quickly reset themselves without requiring any replacement of parts or maintenance assistance. The present invention also provides the advantage of efficient control of the movement of the spray manifold assemblies by the use of sensor assemblies to accurately determine the placement of the spray manifold assemblies relative to the sides of the vehicle.

Other objects, features and advantages of the present invention will be readily appreciated, as the same becomes better understood after reading the subsequent description taken in connection with the accompanying drawings.

BRIEF DESCRIPTION OF THE DRAWINGS

FIG. 6A is a top view of the of the vehicle wash apparatus of the present invention with the spray manifold assemblies disposed in an initial extended position relative to a vehicle;

FIG. 6B is a top view of the vehicle wash apparatus of the present invention with the spray manifold assemblies adjusted to a predetermined width relative to a vehicle;

FIG. 6C is a top view of the vehicle wash apparatus of the present invention with the spray manifold assemblies adjusted to a predetermined width relative to the front of a vehicle;

FIG. 6D is a top view of the vehicle wash apparatus of the present invention with the spray manifold assemblies in a front sweep relative to the front of a vehicle;

FIG. 6E is a top view of the vehicle wash apparatus of the present invention with the spray manifold assemblies adjusted to a predetermined width relative to the front of a vehicle preparatory to a rearward sweep;

FIG. 6F is a top view of the vehicle wash apparatus of the present invention with the spray manifold assemblies located at the rear of a vehicle having completed a rearward sweep;

FIG. 6G is a top view of the vehicle wash apparatus of the present invention with the spray manifold assemblies in a rear sweep over the rear of a vehicle; and FIG. 6H is a top view of the vehicle wash apparatus of the present invention with the spray manifold assemblies adjusted to a predetermined width relative to the rear of a vehicle preparatory to a rearward sweep.

DETAILED DESCRIPTION OF THE PREFERRED EMBODIMENT(S)

Figure 2:
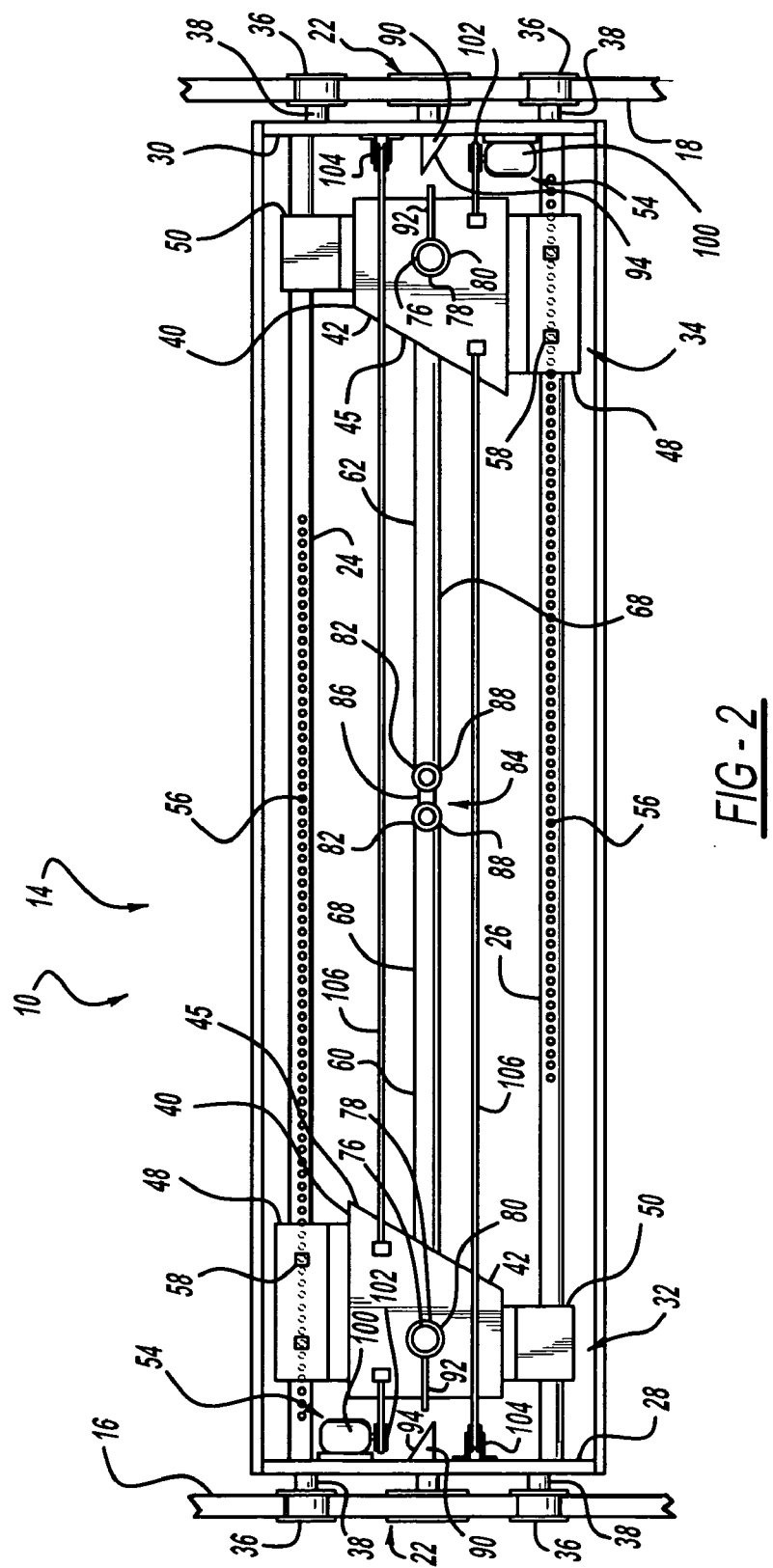
FIG. 2 is a top view of the vehicle wash apparatus of the present invention with the shuttles in the extended position.

A vehicle wash apparatus of the present invention is generally indicated at 10 where like numerals are used to designate like structure throughout the figures. The vehicle wash apparatus 10 is a rollover type system having a carriage assembly adapted to be supported above a vehicle and moveable rectilinearly along the length thereof. Thus, the vehicle wash apparatus 10 includes an overhead carriage assembly generally indicated at 14. As shown in FIG. 2, a pair of spaced longitudinal carriage rails 16 and 18 are provide by a rigid frame assembly (not shown).

The carriage assembly 14 includes at least one carriage drive assembly, generally indicated at 22, a pair of shuttle rails 24, 26. It should be appreciated that the carriage assembly 14 may take on a variety of forms. For example, the carriage assembly 14 may be an enclosed housing, or simply a number of rigid pieces that form a structural framework. Regardless, for the purposes of discussion herein, the carriage assembly 14 provides a means to support the elements of the present invention, and for purposes of illustration the carriage assembly 14, as depicted in the figures, has form of carriage end members 28, 30. The carriage drive assembly 22 is adapted to operatively and selectively move the carriage assembly 14 bi-directionally along the carriage rails 16, 18. The shuttle rails 24, 26 are spaced from one another and extend laterally across the carriage assembly 14. The shuttle rails 24, 26 are operatively supported within the carriage assembly 14, and may be mounted to the carriage end members 28, 30. A pair of opposed shuttle assemblies 32, 34 are operatively supported by the carriage assembly 14 and are moveable toward and away from one another in a direction generally transverse to the rectilinear movement of the carriage assembly 14. More specifically, the pair of opposed shuttle assemblies 32, 34 are slidingly supported on and operatively movable along the shuttle rails 22, 24.

As illustrated in the figures, by way of non-limiting example, to provide movable support of the carriage assembly 14 within the frame, flanged rollers 36 are operatively mounted on posts 38 extend from the carriage end members 28, 30 to support the carriage assembly 14 on the carriage rails 16, 18. It should be appreciated that the shuttle rails 24, 26 may also be extended outward to the carriage rails 16, 18 such that the rollers 36 may be mounted on the ends of the shuttle rails 24, 26 instead of on separate extending posts 38.

Figure 1:
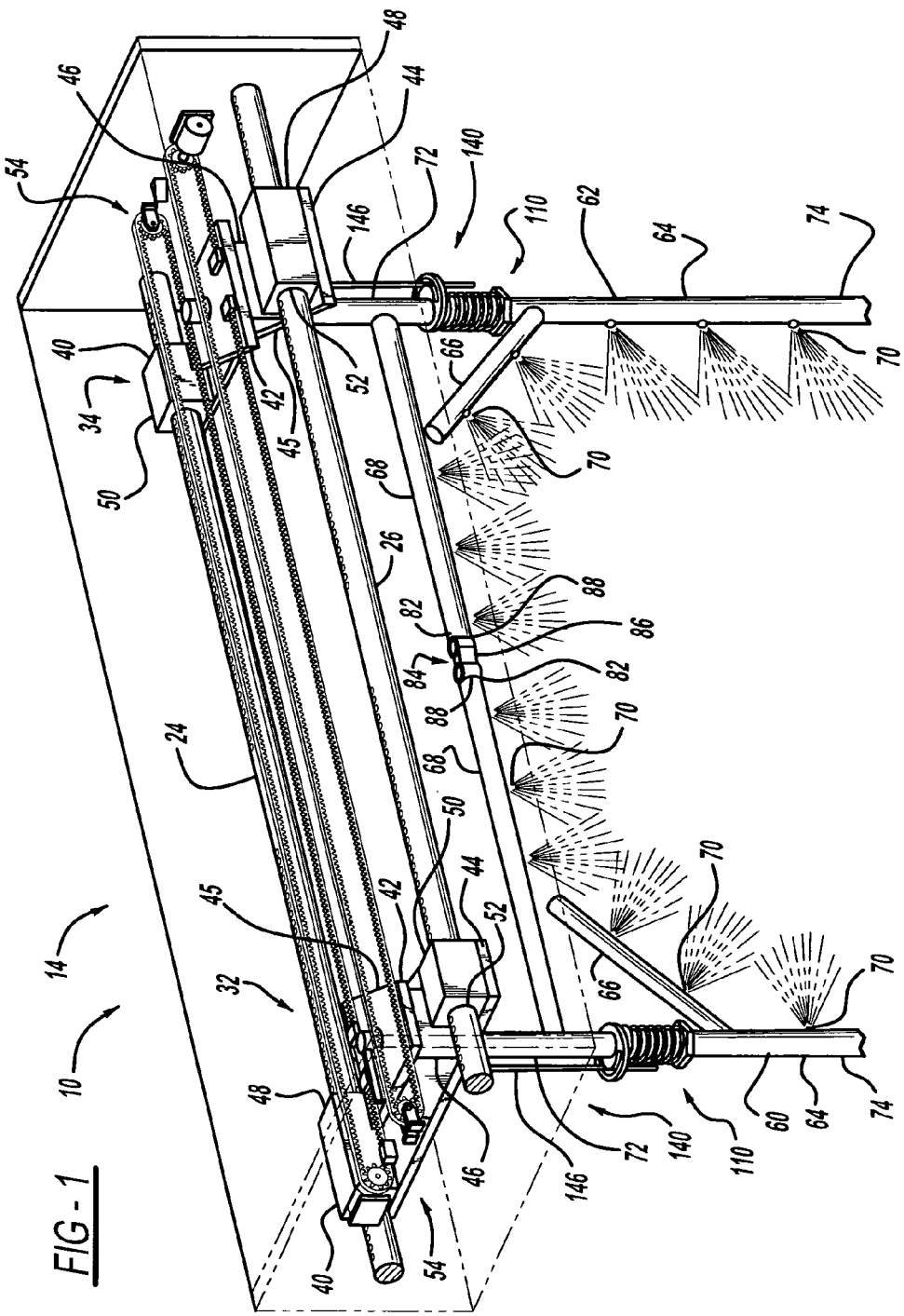
FIG. 1 is a partial perspective view of the vehicle wash apparatus of the present invention.

As best seen in FIG. 1, the shuttle assemblies 32, 34 each include a housing 40 having an upper plate 42 and a lower plate 44 spaced from one another and operatively connected by wall, or riser plates 46. It should be appreciated that, as used herein, the terms "upper" and "lower" are used as non-limiting words of description in reference to the embodiment illustrated in the figures. The upper and lower plates 42, 44 of each housing 40 have a contact surface 45 that faces the opposed shuttle assembly and that is disposed at an angle to cooperatively engage the corresponding contact surfaces 45 on the upper and lower plates 42, 44 of the housing 40 of the opposed shuttle assembly when the shuttle assemblies 32, 34 are moved toward one another in contacting relation.

The shuttle assemblies 32, 34 further include at least one linear bearing to facilitate their transverse movement within the carriage assembly 14. More precisely, in the preferred embodiment the shuttle assemblies 32, 34 are supported by two linear bearings that are formed as rail blocks. As seen in the figures, a first rail block 48 and a second rail block 50 are each supported on the lower plates 44 of the shuttle assemblies 32, 34. The rail blocks 48, 50 each have a rail bore 52 that is slightly larger than the diameter of the shuttle rails 24, 26. Thus, the rail blocks operatively function as linear bearings that are movable along the shuttle rails 24, 26. At least one drive assembly for the shuttle assemblies 24, 26 is provided by the present invention. In the preferred embodiment, a shuttle drive assembly, generally indicated at 54, is provided for each shuttle assembly 32 and 34 that is adapted to operatively and independently move the shuttle 32, 34 bi-directionally along the shuttle rails 24, 26. The shuttle drive assembly 54 will be discussed in detail below.

Figure 3:
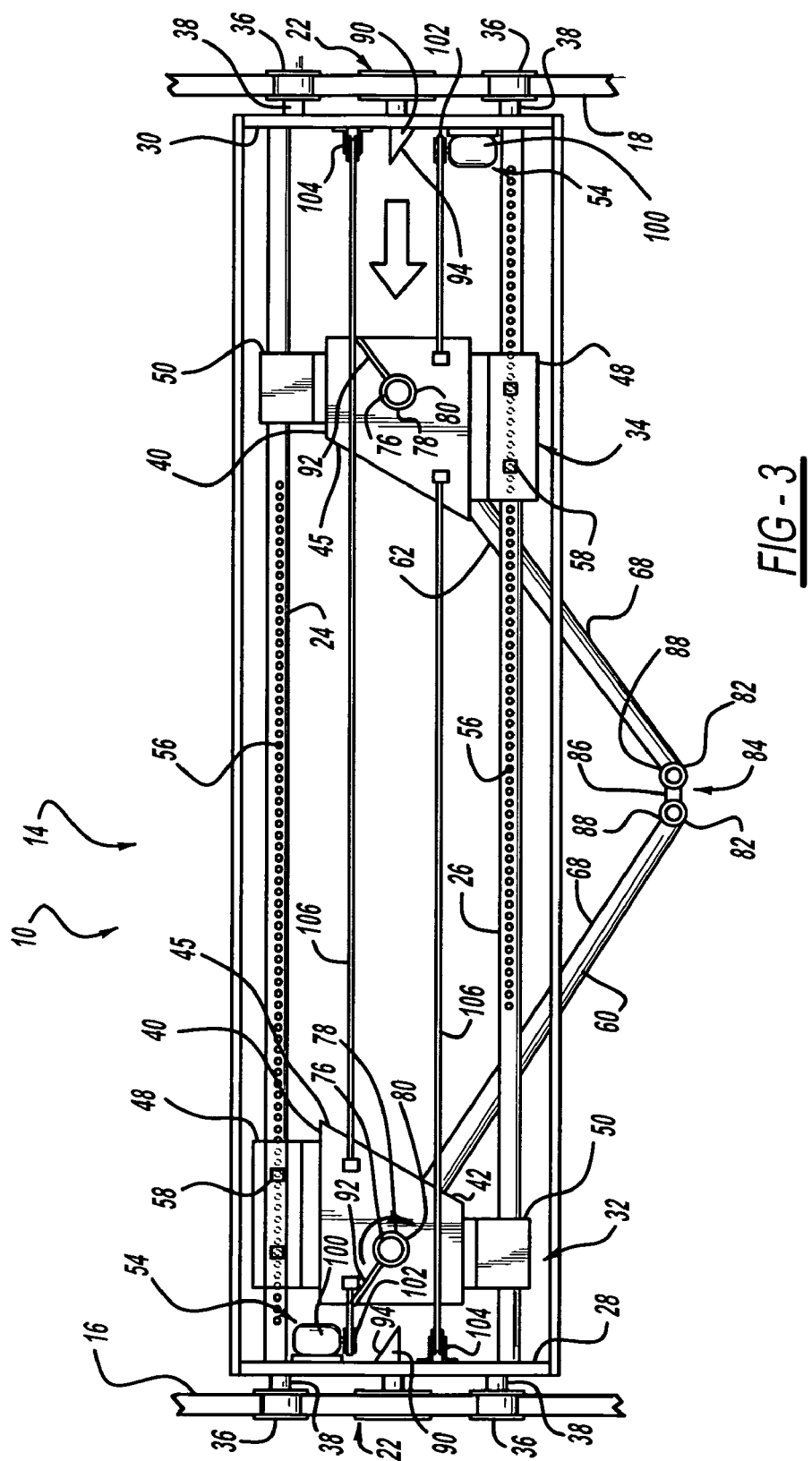
FIG. 3 is a top view of the vehicle wash apparatus of the present invention with the shuttles adjusted to a predetermined width.

As shown in FIGS. 2 and 3, the shuttle rails 24,26 also include a plurality of holes 56 formed in a longitudinal line along their outer surface. The holes 56 cooperate with a pair of proximity switches 58 disposed within each of the rail bores 52 of the first rail blocks 48. The holes 56 and proximity switches 58 detect the exact position of the shuttles 32, 34 along the shuttle rails 24, 26.

The shuttles 32, 34 also each include a pair of spray manifold assemblies, generally indicated at 60 and 62, for delivering fluid to the vehicle. Each one of the pair of spray manifold assemblies 60, 62 are operatively supported by a corresponding one of the opposed shuttle assemblies 32, 34. More specifically, the spray manifolds assemblies 60, 62 include a pair of upside-down L-shaped hollow tubular members that each have a vertical manifold portion 64 that is pivotably suspended from the shuttles 32, 34, an intermediate spray manifold portion 66, and a horizontal manifold portion 68. The vertical manifold portion 64 includes an upper end 72 and a lower end 74. The lower plate 40 and upper plate 42 of each of the shuttles 32 and 34 have coaxial manifold openings 76 that cooperate to accept and retain the upper ends 72 of the vertical portions 64 of the spray manifolds 60, 62 as pivot points 78 (FIG. 2). The horizontal manifold portions 68 extend outward from the vertical portions 64 toward the opposing spray manifold and have inward terminal ends 82 that are disposed generally opposite each other. The intermediate manifold portion 66 is disposed between the horizontal and vertical spray manifolds 64 and 68 at a predetermined angle. In the preferred embodiment, the intermediate portion 66 extends from the vertical portion 64 toward but not connecting with the horizontal portion 68. The vertical 64, intermediate 66, and horizontal 68 manifold portions have a plurality of spray nozzles 70 that are adapted for delivering a fluid solution to a vehicle.

The upper ends 72 of the spray manifolds 60 and 62 provide an attachment point 80 for the delivery of the fluid wash solutions to the spray manifolds 60, 62 and thereby to the spray nozzles 70 for washing a vehicle positioned within the frame. It should be appreciated that some means of fluid connection at the attachment points 80, such as by a flexible hose assembly, is employed to deliver a source of pressurized wash fluids to the manifold 60, 62. A flexible joint, generally indicated at 84, is disposed between and operatively couples the opposed inward terminal ends 82 of the horizontal manifold portions 68 as will be explained in greater detail below.

More specifically, as shown in the figures, the shuttle assemblies 32 and 34, as well as the two spray manifolds 60 and 62 are supported opposite to each other across the carriage assembly 14. The inward terminal ends 82 of the horizontal portions 68 of the spray manifolds 60, 62 are joined to each other at the flexible joint 84. The flexible joint 84 makes it possible for the spray manifolds to each be operatively spaced at a predetermined distance from the sides of the vehicle. The flexible joint 84 further allows the shuttle assemblies 32 and 34 to be driven together on the shuttle rails 24, 26 such that the spray manifolds 60, 62 are rotated about the pivot points 78 and the horizontal portions 68 of the spray manifolds 60, 62 become substantially juxtaposed next to each other. Specifically, the flexible joint 84 interconnects each end 82 of the horizontal manifold portions 68. The flexible joint 84 includes a swing arm 86 of a predetermined length that has a pivot points 88 on each end. Each inward terminal end 82 of the horizontal manifold portions 68 of the spray manifolds 60 and 62 is rotatively joined to one of the pivot points 88 on the swing arm 86.

Each shuttle assembly 32 and 34 includes a shuttle stop 90. As best shown in FIGS. 2 and 3, for purposes of illustration, the shuttle stops 90 may each be mounted to the inside of the carriage end members 28 and 30. The shuttle stops 90 extend inward toward each other and prevent the shuttle assemblies 32, 34 from traveling too far in either direction along the shuttle rails 24, 26. Each of the pair of opposed shuttle assemblies 32, 34 further include a deflector member 92 that is mounted to the upper end 72 of the vertical portion 64 of the spray manifold 60, 62 and aligned with a corresponding one of the shuttle stops 90. The deflection members 92 are adapted to cooperate with the shuttle stops 90 when the corresponding shuttle assembly 32, 34 is moved into contact with the shuttle stop 90. More specifically, the shuttle stop 90 further includes an angled face 94 that is exposed to and cooperates with the deflection members 92 of the shuttle assemblies 32, 34. The deflection members 92 are each fixedly mounted to the vertical manifold portions 64 of the respective spray manifolds 60, 62 and extend toward the angled face 94 of the shuttle stops 90. When either of the shuttle assemblies 32, 34 are driven outward toward the respective shuttle stop 90, the respective deflection member 92 is caused to contact and cooperatively move along the angled face 94 thereby causing the spray manifold assemblies 60, 62 to pivot about the axis defined by the vertical portion 64 and flex the flexible joint 84.

The angled faces 94 of the shuttle stops 90 are oppositely oriented to each other across the carriage assembly 14 such that operatively driving one of the shuttle assemblies 32, 34 toward its respective shuttle stop 90 influences the flexible joint 84 to deflect in a particular direction. This also causes the vertical manifold portions 64 to rotate about their axis in one particular direction. Operatively driving the other shuttle assembly 32, 34 toward its respective shuttle stop 90 causes the spray manifold assemblies 60, 62 to rotate in the opposite direction. This action adjusts the position of one or both of the vertical portions 64 toward the vehicle.

Thus, each of the pair of spray manifold assemblies 60, 62 move in a number of ways about the vehicle. First, the spray manifold assemblies 60, 62 move rectilinearly with the carriage assembly 14 along the length of the vehicle. Second, each of the spray manifold assemblies 60, 62, move transversely with the shuttle assemblies 32, 34 respectively to adjust the location of the vertical manifold portions 64 relative to the sides of the vehicle. Third, each of the spray manifold assemblies 60, 62 are pivotally moveable about the axis defined by the vertical manifold portion 64. Furthermore, as will be described below, this pivotal action of the spray manifold assemblies 60, 62 in conjunction with the flexing movement of the flexible joint 84, allows the spray manifold assemblies 60, 62 to move toward and away from one another to circumscribe the front and the rear of the vehicle.

The shuttles 32, 34 are operatively driven along the shuttle rails 24, 26 by the shuttle drive assemblies 54. The shuttle drive assemblies 54 each include a shuttle drive motor 100 having a drive wheel 102, and idler wheel 104, and a drive belt 106. The drive motor 100 is mounted to the carriage assembly 14, and for purposes of discussion, may be mounted to one of a carriage end member 28, 30 with the idler wheel 104 mounted to the opposite end member 28, 30. The drive belt 106 is operatively looped between the drive wheel 102 and the idler wheel 104 and is fixedly secured to one of the shuttle assemblies 32, 34. The selective operation of the drive motor 100 acts upon the drive belt 106 to cause the respective shuttle assembly 32, 34 to move along the shuttle rails. It should be appreciated that the drive belt 106 may be one of a variety of linked chains or flexible belts that may be successfully employed in the vehicle wash environment. Similarly, the circumferential edge of the idler wheel 104 and the drive wheel 102 are of a form that is operatively compatible with the chosen form of the drive belt 106. It should be appreciated that shuttle drive assemblies 54 provide the necessary torque to over come the interaction of the previously discussed holes 56 and proximity switches 58, which detect the exact position of the shuttles 32, 34 along the shuttle rails 24, 26.

Figure 4:
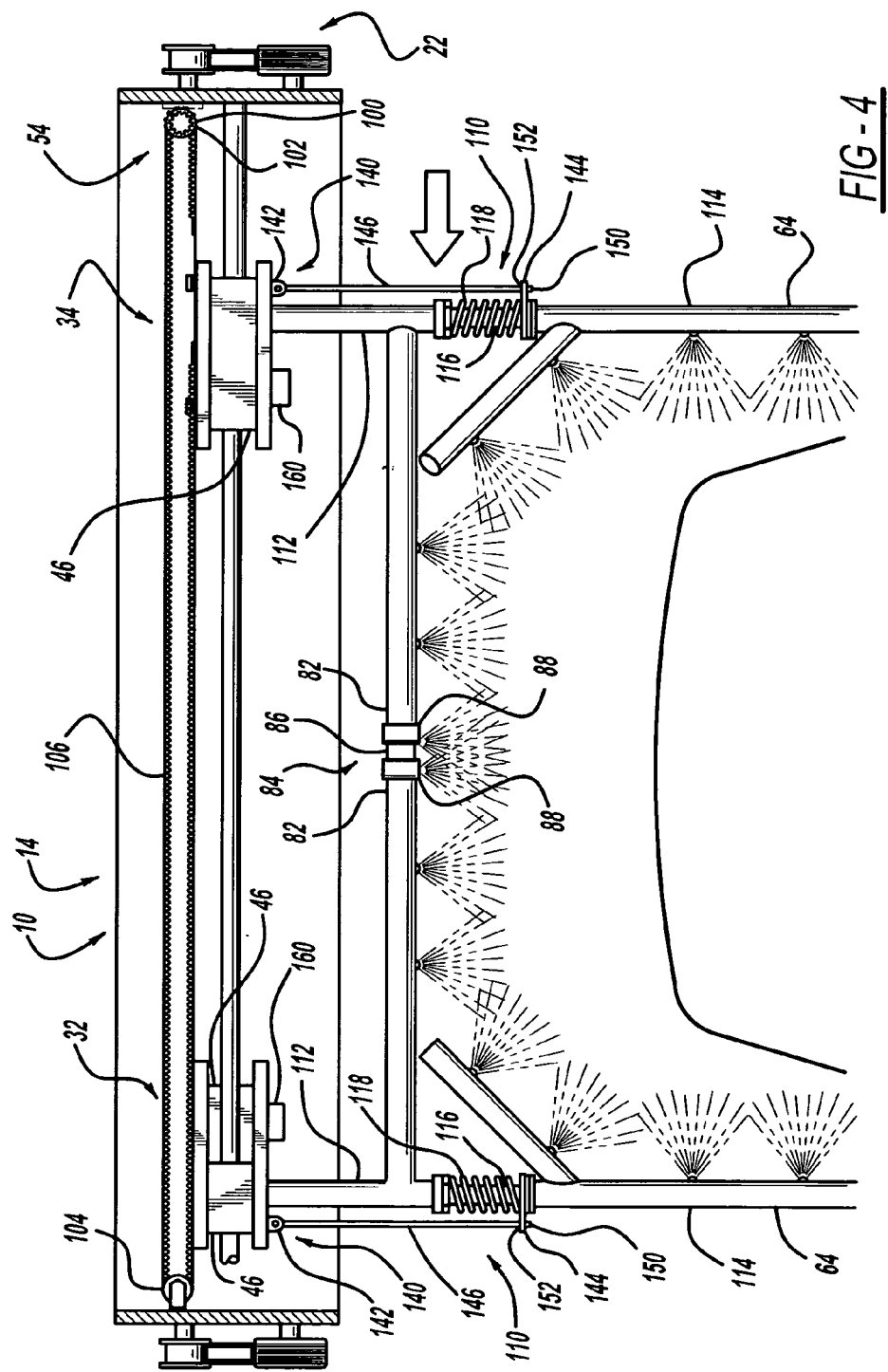
FIG. 4 is a side view of the vehicle wash apparatus of the present invention with the shuttles adjusted to the predetermined width illustrated in FIG. 3.
Figure 5:
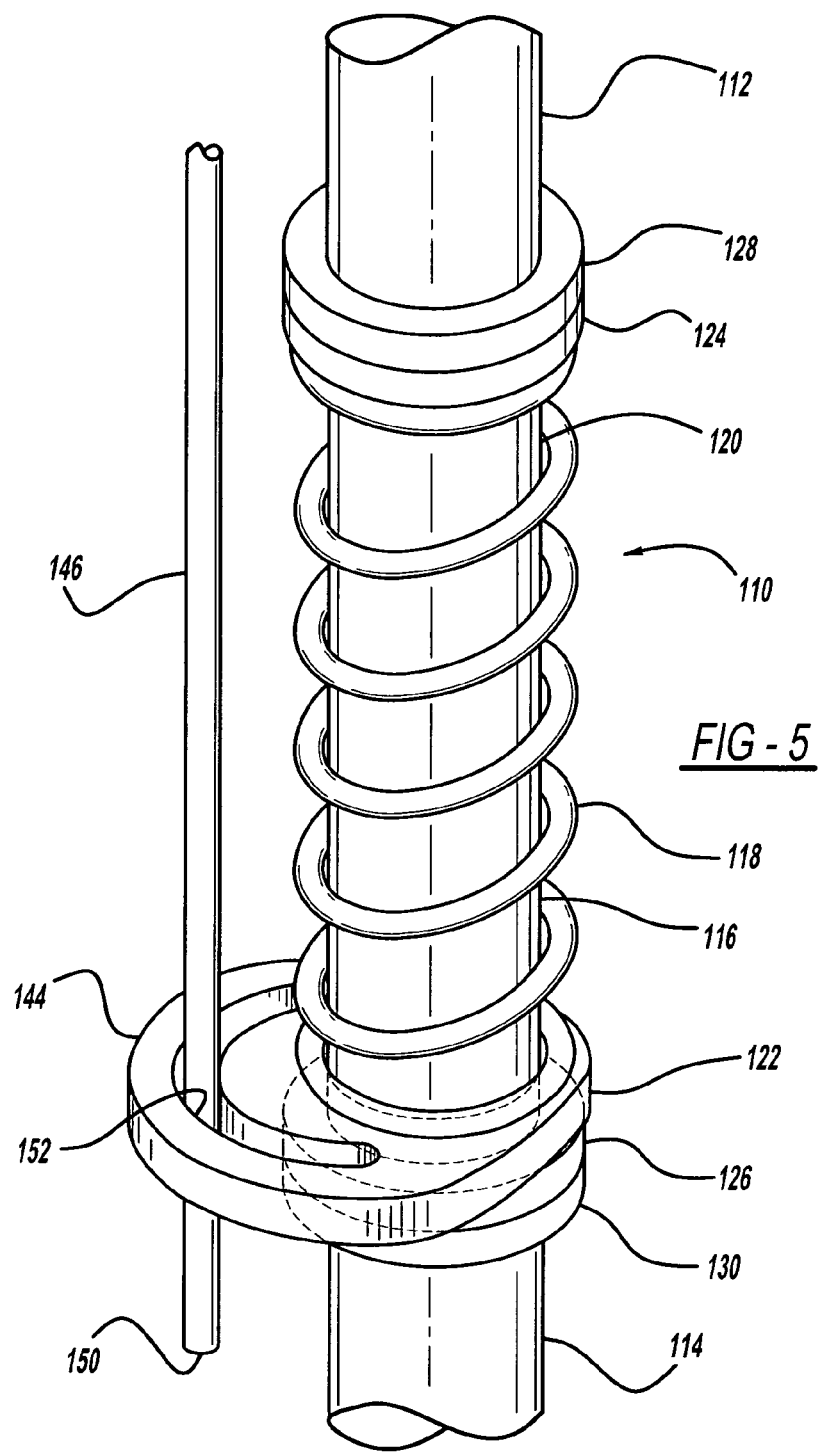
FIG. 5 is an enlarged partial perspective view of the breakaway safety joint of the vehicle wash apparatus of the present invention.

As best shown in FIGS. 4 and 5, the vertical portions 64 of the spray manifolds 60, 62 each include a breakaway safety joint that is generally indicated at 110. The vertical manifold portions 64 of the spray manifold assemblies 60, 64 further include a pair of rigid vertical manifold portions 112 and 114 with the breakaway safety joint 100 disposed therebetween. Each of the breakaway safety joints 110 further include a flexible coupling 116 and a return biasing member 118. The breakaway safety joint 110 acts to allow the vertical manifold portion 64 to flex about the flexible coupling 116 in response to the spray manifold 60, 62 coming in contact with, or being contacted by, an obstruction. The return biasing member 118 acts to bias the flexible coupling 116 back into vertical alignment when the obstruction is removed.

The flexible coupling 116 is a flexible conduit that is adapted to provide fluid communication between the pair of rigid vertical portions 112 and 114 of the vertical manifold portion 64 thereby providing for the delivery of fluid to the vehicle throughout the full length of the vertical manifold portion 64 of the spray manifold assembly 60, 62. In the preferred embodiment, the flexible coupling 116 and the return biasing member 118 are separate components, such that the return biasing member 118 is a coiled spring that is disposed over the flexible coupling 116. It should be appreciated however, that the flexible coupling 116 and the return biasing member 118 may also be a single component that provides both fluid communication and a return biasing force, or that the component may be otherwise combined, such as a flexible material molded over a coiled spring. As shown in detail in FIG. 5, the breakaway safety joint 110 further includes a first longitudinal end 120 and a second longitudinal end 122. Each longitudinal end 120, 122 has a connecting flange 124 and 126, respectively. Each of the rigid portions 112, 114 of the vertical manifold portions 64 also has flanged ends 128 and 130, respectively. The connecting flanges 124, 126 of the breakaway safety joints are operatively mounted between the flanged ends 128 and 130 of the rigid portions 112 and 114 of the vertical manifold portions 64.

Thus, the breakaway safety joints 110 allow the spray manifolds 60, 62 to be deflected without causing damage and without sustaining damage if the vertical portion 64 of the spray manifold 60, 62 comes in contact with any obstruction. Furthermore, the flexible coupling 116 and return biasing member 118 cause the vertical portion 64 of the spray manifold 60, 62 to immediately return to its normal position when the obstruction is removed while maintaining water tight integrity.

The breakaway safety joint 110 further includes a sensor assembly generally indicated at 140. The sensor assembly 140 is adapted to monitor the alignment of the breakaway safety joint 110 and operatively provide a signal to a higher level control device such as the ECU previously discussed, when the breakaway safety joint 110 becomes deflected. The sensor assembly 140 includes a sensor main body 142, a sensor ring 144, and a sensor rod 146. The sensor main body is mounted to the carriage assembly 14, and more specifically to the underside of the lower plate 44 of the respective shuttle assembly 32, 34. The sensor ring 144 is mounted to the flanged end 122 of the breakaway safety joint 110. The sensor rod 146 has a proximate end 148 and a distal end 150. The proximate end 148 is operatively mounted to the sensor main body 142 and the distal end 150 extends from the sensor main body 142 downward to operatively cooperate with the sensor ring 144.

The sensor ring 144 further includes a sensor rod opening 152 that is adapted to accept and receive the distal end 150 of the sensor rod 146, such that any deflection of the vertical manifold portion 64 of the spray manifold 60, 62 causes the sensor ring 144 to deflect the sensor rod 146 thereby activating the sensor main body 142 of the sensor assembly 140. Since the spray manifolds 60 and 62 are pivotably mounted to the carriage assembly 14 to allow selective rotational movement of the spray manifolds 60, 62, the sensor rod opening 152 of the sensor ring 144 is further defined as an arcuate opening. The arcuate sensor rod opening 152 is adapted to allow the sensor ring 144 to move about the distal end 150 of the sensor rod 144 without activating the sensor main body 142 as the spray manifold 60, 62 pivots. However, the arcuate sensor rod opening 152 is further adapted to cause the sensor rod 146 to deflect and activate the sensor main body 142 when the spray manifold 60, 62 is deflected out of vertical alignment by an obstruction regardless of the pivotal position of the spray manifold 60, 62 at the time. When the sensor ring 146 is deflected and the sensor main body 142 is activated, the sensor main body 142 signals the ECU that the respective spray manifold 60, 62 is in contact with an object. It should be appreciated that this sensor information may be used in any of a variety of ways to control the further actions of the wash system.

As shown in FIG. 4, the present invention may also include a pair of sensor assemblies 160. The sensor assemblies 160 may each be disposed upon one of the respective shuttle assemblies 32, 34 and oriented to determine the transverse position of the respective spray manifold assemblies 60, 62 within the carriage assembly 14 with respect to the sides of the vehicle. The sensor assemblies 160 sense the distance of the spray manifold assemblies 60, 62 from the sides of the vehicle and provide the information to a higher-level control. In the preferred embodiment, the sensor assemblies 160 are sonically active devices to provide detection of the vehicle sides as the shuttle assemblies 32, 34 are moved into proximity to the vehicle sides. It should be appreciated that the sensor assemblies 160 may also be optically active devices or a combination of sonic and optic sensing devices. In this manner, the ECU controlling the placement and movement of the spray manifold assemblies 60, 62 is provided with the information regarding the proximity of the spray manifold assemblies 60, 62 to the vehicle at all times so that the optimum distance may be set and maintained throughout the wash event. Furthermore, the information provided by the sensor assemblies 160 allow the spray manifold assemblies 60, 62 to be controlled to optimally and efficiently circumscribe the vehicle without striking the vehicle.

In operation, a vehicle is parked in a wash bay that has a rigid frame with a pair of elevated space carriage rails of the type of which the present invention is employed. The car wash apparatus of the present invention may also employ additional devices to ensure that the vehicle is generally located equilaterally between the carriage rails and is at a predetermined depth within the bay. For example, some type of alignment pad having ridges accompanied by a visible indicator or sensors may be used for this purpose. As previously mentioned, the wash apparatus may also employ a control device such as an electronic control unit (ECU) with stored programming that operatively controls the functions of the rollover vehicle wash system. Furthermore, the ECU control of the operative functions of the vehicle wash system include not only the movement of the carriage assembly 14 and the spray manifolds 60, 62 as will be discussed below, but also the delivery of the pressurized wash fluids to the spray manifolds 60, 62.

Once the vehicle is in place, its specific lateral and longitudinal location within the wash bay is determined by a sensor such as the sensor assemblies 160. This information is used by the ECU to move the shuttles assemblies 32 and 34 to locate the vertical manifold portions 64 of the spray manifolds 60, 62 at a predetermined distance from the sides of the vehicle for optimum cleaning effect. It should be appreciated that various parameters for controlling the wash event may be predetermined and stored by the ECU, and that these parameters may be operatively selected by the influence of other variables. For example, a range of distances at which to set the vertical portions 64 of the spray manifolds 60 and 62 from the sides of the vehicle may be predetermined and stored by the ECU and that the particular distance may be operatively chosen by considering such variables as delivery pressure, delivery temperature, and pH levels of the wash chemicals. Once a determination has been made as to the desired distance to set the spray manifolds 60, 62 from the vehicle, the shuttles 32 and 34 are moved to position the manifold in the designated location relative to the vehicle. To this end, the flexible joint assembly 84 is influenced to bend in one horizontal direction or the other so that the spray manifolds 60, 62 pivot about pivot points 78 thereby adjusting the location of each of the spray manifolds 60, 62 relative to the vehicle.

For example, FIGS. 6A through 6H illustrate one mode of operation of the wash event and the movement of the spray manifolds 60, 62 for a rigid frame rollover vehicle wash system employing the present invention. FIG. 6A illustrates the vehicle 170 after being moved into the wash bay, generally indicated at 172. For clarity, only the spray manifolds 60, 62, and the flexible joint 84 are indicated above the vehicle 170. As illustrated, the vehicle 170 has a front end 174, a rear end 176, a left side 178 and a right side 180. The heavier phantom lines 175 in FIGS. 6A through 6H illustrate the general position of the vertical portions 64 relative to the vehicle of the spray manifold assemblies 60, 62 and the general rectilinear path they would follow were no adjustment of the shuttles 32, 34 made.

As shown in FIG. 6B, the sensor assemblies 160 (FIG. 4) cooperate with the ECU to determine that the vehicle 170 is closer to the left spray manifold 60 than the right spray manifold 62. It should be appreciated that the ECU will also determine, as previously mentioned, the optimum distance at which to place the vertical portions of the spray manifolds 60, 62 from the sides of the vehicle. In this example, the ECU determines that it is necessary to move the right spray manifold 62 toward the right side 160 of the vehicle 170 while maintaining the present distance of the left spray manifold 60 from the vehicle. More specifically, the ECU makes the determination to move the right shuttle assembly 34 to bring the vertical portions 64 of spray manifolds 62 to the lighter phantom line 177. Furthermore, a forward sweep of the vehicle 170 is to be performed first. Thus, in preparation for sweeping the front end 174 of the vehicle 170, it is desirable to cause the flexible joint 84 and spray manifolds 60, 62 to pivot toward the rear end 176 of the vehicle. To cause the spray manifolds 60, 62 to pivot and the flexible joint 84 to give in that particular direction, both shuttles 32 and 34 will be driven toward the left.

As best shown in FIG. 3, the deflection member 92 on shuttle 32 will contact the angled surface 94 of the shuttle stop 90 to cause the spray manifold 60 to pivot clockwise. Flexible joint 84 will also be influenced to deflect and cause the innermost end 82 of the horizontal manifold portion 66 of spray manifold assembly 62 to move in the direction of the rear 176 of the vehicle, causing a counter-clockwise rotation of spray manifold assembly 62. As this occurs, both shuttle assemblies 32, 34 may be driven toward each other, or one shuttle may be held stationary and the other driven individually toward it, or both may be driven in the same direction by the shuttle drive assembly 54 depending on the determination of spray manifold placement in regard to the sides 178, 180 of the vehicle 170. For this example, the distance between the shuttle assemblies 32, 34 is decreased so that both spray manifolds 60, 62 will reach the desired distance to the sides 178, 180 of the vehicle 170, as indicated in FIG. 6B.

Once the distance of the spray manifolds 60, 62 from the vehicle sides 178, 180 are set, the carriage assembly 14 is moved to the front end 174 of the vehicle 170 reaching the position indicated in FIG. 6C. It should be appreciated that throughout the remainder of the wash event, wash chemicals are being applied through the spray manifolds to the vehicle as determined and controlled by the ECU programming. The ECU stops the carriage assembly 14 when it reaches the desired position just forward of the front end 174 of the vehicle 170. The forward stopping position is determined to provide the optimum spray distance for the sweep of the front end 174 by the spray manifolds 60, 62. As shown in FIG. 6D, to accomplish a sweep of the front end 174 of the vehicle 170, the shuttle assemblies 32, 34 are driven by the shuttle drive assembly 54 toward each other so that the flexible joint 84 continues to bend and the spray manifolds 60, 62 continue to pivot about the vertical axis defined at pivot points 78 until both the vertical 64 and the horizontal portions 68 of the spray manifolds are juxtaposed respectively. In this manner, the front end 174 of the vehicle 170 is swept.

FIG. 6E shows how in preparation for the rearward sweep and the sweep of the rear end 176 of the vehicle, the shuttles 32, 34 are drawn apart from each other, and the right shuttle 34 is driven to the right toward its shuttle stop 90 by the shuttle drive assembly 54. As the right shuttle 34 reaches the shuttle stop 90 the deflection member 92 engages on the angled surface 94, which causes the flexible joint 84 to swing forward, and begin to pivot the spray manifolds 60, 62 away from the front end 174 of the vehicle 170. The shuttle drive assembly 54 again moves the shuttles 32, 34 to place them at the determined optimum distance from the sides 178, 180 of the vehicle 170 and the carriage assembly 14 is driven rearward to the position shown in FIG. 6F. In a similar way, but opposite to the movement at the front of the vehicle 170 in FIG. 6D, FIG. 6G illustrates how the shuttle assemblies 32 and 34 are again driven together to cause the horizontal portions 64 to sweep the rear end 176 of the vehicle 170. Then, FIG. 6H illustrates how the shuttle assemblies 32, 34 are again placed at the optimum distance from the sides 178, 180 of the vehicle 170 to allow for the next forward pass.

It should be appreciated that the movements of the carriage assembly 14, the shuttle assemblies 32, 34, and the spray manifolds 60, 62 as shown in FIG. 6B thorough 6H may be repeated quickly and efficiently for a number of cycles depending upon the desired effects. For example, a first such pass may either provide a pre-wash solution or begin with the main washing solution. Then, a second pass could provide a rinse and a third pass a wax solution application. It should be further appreciated that an efficient change over of chemicals can be performed with the present invention. By way of another example, if the application of the main washing solution is initiated from the start position shown in FIG. 6A and continued through FIG. 6H, then as the carriage assembly 14 is begins to move forward, the washing solution can be stopped and the rinse started. In this manner, the wash solution will purge out of the spray manifolds about the time the carriage assembly 14 passes the mid point of the vehicle 170. This is likewise repeatable for each changeover of wash chemicals and water.

Thus, the embodiments of the present invention overcome the limitations of the conventional vehicle wash systems by providing a vehicle wash system including a rigid frame that has the advantage of a mechanically simplified structure. The simplified structure utilizes two independently movable spray manifold assemblies to circumscribe the vehicle quickly and efficiently with an effective but minimal use of water and chemicals. Another advantage of the present invention is that the spray manifold assemblies employ vertical, horizontal, and intermediate manifold portions to efficiently apply the wash chemicals. Another advantage of the present invention is that damage to the vehicle and to the wash system is greatly reduced by breakaway safety joints in each spray manifold assembly. Still another advantage is that the breakaway safety joints quickly reset themselves without requiring any replacement of parts or maintenance assistance. The present invention still further provides the advantage efficient operative control of the movement of the spray manifold assemblies by the use of sensor assemblies to accurately determine the placement of the spray manifold assemblies relative to the sides of the vehicle.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

I claim:

1. A vehicle washing apparatus comprising:
   a carriage assembly adapted to be supported above a vehicle and moveable rectilinearly along the length thereof;
   a pair of opposed shuffle assemblies operatively supported by said carriage assembly and moveable toward and away from one another in a direction generally transverse to the rectilinear movement of said carriage assembly;
   a pair of spray manifold assemblies for delivering fluid to the vehicle, each one of said pair of spray manifold assemblies operatively supported by a corresponding one of said opposed shuttle assemblies, each of said spray manifold assemblies including a vertical manifold portion operatively supported for rotational movement by a corresponding one of said pair of shuttle assemblies about an axis defined by said vertical manifold portion;
   each of said pair of spray manifold assemblies moveable rectilinearly with said carriage assembly along the length of the vehicle, transversely with said respective one of said pair of shuttle assemblies to adjust the location of said vertical manifold portion relative to the vehicle, and pivotally about the axis defined by said vertical manifold portion to allow said pair of spray manifold assemblies to move toward and away from one another and to circumscribe the vehicle; and
   wherein each of said spray manifold assemblies further include a horizontal manifold portion having an inward terminal end with each of said inward terminal ends disposed generally opposite the other and a flexible joint disposed between and operatively coupling the opposed inward terminal ends of said horizontal manifold portions.

2. A vehicle washing apparatus as set forth in claim 1 wherein said apparatus further includes a pair of shuttle rails extending across said carriage assembly generally traverse to the direction of rectilinear movement thereof, each of said pair of opposed shuffle assemblies operatively mounted to said pair of shuttle rails and adapted to transversely move toward and away from one another.

3. A vehicle washing apparatus as set forth in claim 2 wherein said apparatus further includes a pair of opposed shuttle stops operatively mounted to said carriage assembly, each of said pair of opposed shuttle assemblies including a deflector member that is aligned with a corresponding one of said shuttle stops and adapted to cooperate with said shuttle stop when the corresponding shuttle assembly is moved outward toward said shuttle stop to bias said flexible joint and to cause said vertical manifold portion to pivot allowing said pair of spray manifold assemblies to be driven toward one another.

4. A vehicle washing apparatus as set forth in claim 3 wherein each of said shuttle stops further includes an angled face that cooperates with said deflection members of said shuttle assemblies, said deflection members each being operatively connected to said vertical manifold portions of said respective spray manifolds and extending toward said angled face of said shuttle stops such that when either of said shuttle assemblies is driven outward toward said respective shuttle stop, said respective deflection member is caused to contact and cooperatively move along said angled face thereby causing said spray manifold to pivot and flex said flexible joint.

5. A vehicle washing apparatus as set forth in claim 4 wherein said angled faces of said shuttle stops are oppositely oriented to each other across said carriage assembly such that driving one of said shuttle assemblies toward its said respective shuttle stop causes said pair of spray manifolds to rotate about their said axis in one direction and driving the other said shuttle assembly to its said respective shuttle stop causes said spray manifold assemblies to rotate in the opposite direction.

6. A vehicle washing apparatus as set forth in claim 2 wherein each of said shuffle assemblies have a housing and at least one linear bearing connected to said housing, said at least one linear bearing operatively mounted to at least one of said pair of shuttle rails to allow said pair of spray manifold assemblies to be moved toward and away from one another.

7. A vehicle washing apparatus as set forth in claim 6 wherein each of said housings have two linear bearings spaced apart from one another such that each said linear bearing is operatively mounted to one of said pair of shuttle rails.

8. A vehicle washing apparatus as set forth in claim 6 wherein said housing includes an upper plate, a lower plate, and walls extending therebetween, said upper and lower plates of each housing having a contact surface that faces the opposed shuttle assembly and that is disposed at an angle to cooperatively engage the corresponding contact surfaces on said upper and lower plates of the housing of the opposed shuffle assembly when said shuttle assemblies are moved toward one another in contacting relation.

9. A vehicle washing apparatus as set forth in claim 2 wherein said apparatus further includes at least one shuttle drive assembly adapted to operatively said shuffles bi-directionally along said shuffle rails.

10. A vehicle washing apparatus as set forth in claim 2 wherein said pair of opposed shuttle assemblies each include a shuffle drive assembly adapted to operatively and independently move each of said shuttles bi-directionally along said shuttle rails.

11. A vehicle washing apparatus as set forth in claim 10 wherein each of said pair of shuttle drive assemblies further include a drive motor having a drive wheel, an idler wheel, and a drive belt operatively looped therebetween, said drive belt being fixedly mounted to one of said shuttle assemblies such that said selective operation of said drive motor acts upon said drive belt to cause said respective shuttle assembly to move along said pair of shuttle rails.

12. A vehicle washing apparatus comprising:
    a carriage assembly adapted to be supported above a vehicle and moveable rectilinearly along the length thereof, said carriage assembly including a pair of shuttle rails extending thereacross generally transverse to the direction of rectilinear movement of said carriage assembly;
    a pair of opposed shuttle assemblies operatively mounted to said pair of shuttle rails and independently moveable toward and away from one another in a direction generally transverse to the rectilinear movement of said carriage assembly;
    a pair of spray manifold assemblies for delivering fluid to the vehicle, each of said pair of spray manifold assemblies including a vertical manifold portion operatively supported for rotational movement from one of said pair of shuttle assemblies about an axis defined by said vertical manifold portion, each of said pair of spray manifold assemblies rectilinearly moveable with said carriage assembly along the length of the vehicle, transversely and independently movable with the respective one of said pair of shuttle assemblies toward and away from one another to adjust the location of the vertical manifold portions relative to the vehicle, and pivotally movable about the axis defined by said vertical manifold portion to circumscribe the vehicle; and
    wherein each of said spray manifold assemblies further include a horizontal manifold portion having an inward terminal end with each of said inward terminal ends disposed generally opposite the other and a flexible joint disposed between and operatively coupling the opposed inward terminal ends of said horizontal manifold portions.

13. A vehicle washing apparatus as set forth in claim 12 wherein said apparatus further includes a pair of opposed shuttle stops operatively mounted to said carriage assembly, each of said pair of opposed shuttle assemblies including a deflector member that is aligned with a corresponding one of said shuttle stops and adapted to cooperate with said shuttle stop when the corresponding shuttle assembly is moved into contact with said shuttle stop to bias said flexible joint and to cause said vertical manifold portion to pivot allowing said pair of spray manifold assemblies to be driven toward one another.

14. A vehicle washing apparatus as set forth in claim 13 wherein each of said shuttle stops further includes an angled face that is exposed to and cooperates with said deflection members of said shuttle assemblies, said deflection members each being operatively connected to said vertical manifold portions of said respective spray manifolds and extending toward said angled face of said shuttle stops such that when either of said shuttle assemblies is driven outward toward said respective shuttle stop, said respective deflection member is caused to contact and cooperatively move along said angled face thereby causing said spray manifold to pivot and flex said flexible joint.

15. A vehicle washing apparatus as set forth in claim 14 wherein said angled faces of said shuttle stops are oppositely oriented to each other across said carriage assembly such that driving one of said shuttle assemblies toward its said respective shuttle stop causes said pair of spray manifolds to rotate about their said axis in one direction and driving the other said shuttle assembly to its said respective shuttle stop causes said spray manifold assemblies to rotate in the opposite direction.

16. vehicle washing apparatus as set forth in claim 12 wherein each of said shuttle assemblies have a housing and at least one linear bearing connected to said housing, said at least one linear bearing operatively mounted to at least one of said pair of shuttle rails to allow said pair of spray manifold assemblies to be moved toward and away from one another.

17. A vehicle washing apparatus as set forth in claim 16 wherein each of said housings have two linear bearings spaced apart from one another such that each said linear bearing is operatively mounted to one of said pair of shuttle rails.

18. A vehicle washing apparatus as set forth in claim 17 wherein said housing includes an upper plate, a lower plate, and walls extending therebetween, said upper and lower plates of each housing having a contact surface that faces the opposed shuttle assembly and that is disposed at an angle to cooperatively engage the corresponding contact surfaces on said upper and lower plates of the housing of the opposed shuttle assembly when said shuttle assemblies are moved toward one another in contacting relation.

19. A vehicle washing apparatus as set forth in claim 12 wherein said apparatus further includes at least one shuttle drive assembly adapted to operatively said shuttles bi-directionally along said shuttle rails.

20. A vehicle washing apparatus as set forth in claim 12 wherein said pair of opposed shuttle assemblies each include a shuttle drive assembly adapted to operatively and independently move each of said shuttles bi-directionally along said shuttle rails.

21. A vehicle washing apparatus as set forth in claim 20 wherein each of said pair of shuttle drive assemblies further include a drive motor having a drive wheel, an idler wheel, and a drive belt operatively looped therebetween, said drive belt being fixedly mounted to one of said shuttle assemblies such that said selective operation of said drive motor acts upon said drive belt to cause said respective shuttle assembly to move along said pair of shuttle rails.

22. A vehicle washing apparatus comprising:
    a carriage assembly adapted to be supported above a vehicle and moveable rectilinearly along the length thereof;
    a pair of spray manifold assemblies for delivering fluid to the vehicle, each of said pair of spray manifold assemblies including a horizontal manifold portion, a vertical manifold portion operatively supported for rotational movement by said carriage assembly about an axis defined by said vertical manifold portion, and an intermediate spray manifold portion disposed at a predetermined angle relative to and extending between the horizontal and vertical manifold portions;

each of said pair of spray manifold assemblies rectilinearly moveable with said carriage assembly along the length of the vehicle, transversely moveable to adjust the location of said pair of spray manifold assemblies relative to the vehicle, and pivotally movable about the axis defined by said vertical manifold portion to circumscribe the vehicle; and wherein each of said horizontal manifold rortion have an inward terminal end with each of said inward terminal ends disposed generally opposite the other and a flexible joint disposed between and operatively coupling the opposed inward terminal ends of said horizontal manifold portions.

* * * * *